United States Patent
Marone et al.

(10) Patent No.: US 10,864,979 B2
(45) Date of Patent: Dec. 15, 2020

(54) SYSTEM AND METHOD FOR PROPELLER FEEDBACK RING POSITION DETECTION

(71) Applicant: PRATT & WHITNEY CANADA CORP., Longueuil (CA)

(72) Inventors: Joseph Ernesto Marone, Montreal (CA); Ian Farrell, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 110 days.

(21) Appl. No.: 16/020,930

(22) Filed: Jun. 27, 2018

(65) Prior Publication Data

US 2020/0001977 A1    Jan. 2, 2020

(51) Int. Cl.
*B64C 11/30* (2006.01)
*B64D 45/00* (2006.01)
*F01D 7/00* (2006.01)

(52) U.S. Cl.
CPC ........ *B64C 11/301* (2013.01); *B64D 45/0005* (2013.01); *F01D 7/00* (2013.01); *F05D 2260/74* (2013.01); *F05D 2260/76* (2013.01)

(58) Field of Classification Search
CPC ..... B64C 11/301; B64D 45/0005; F01D 7/00; F01D 7/02; F05D 2260/70; F05D 2260/74–79; G01B 5/24
USPC .......................................................... 416/61
See application file for complete search history.

(56) References Cited

U.S. PATENT DOCUMENTS

| 3,895,883 | A | * | 7/1975 | Pedersen | B63H 3/00 |
| | | | | | 416/61 |
| 5,211,539 | A | * | 5/1993 | McCarty | B64C 11/301 |
| | | | | | 250/231.13 |
| 6,767,187 | B2 | | 7/2004 | Franchet et al. | |
| 6,811,376 | B2 | * | 11/2004 | Arel | B64C 11/38 |
| | | | | | 416/155 |
| 8,360,728 | B2 | | 1/2013 | Hildebrand et al. | |

(Continued)

FOREIGN PATENT DOCUMENTS

| EP | 3284666 | | 2/2018 | | |
| GB | 576046 | A * | 3/1946 | ........... | B64C 11/301 |

(Continued)

*Primary Examiner* — Michael Lebentritt
*Assistant Examiner* — Topaz L. Elliott
(74) *Attorney, Agent, or Firm* — Norton Rose Fulbright Canada LLP

(57) ABSTRACT

A system and method for determining a position of a feedback ring of a propeller of an aircraft engine are provided. The feedback ring is coupled to the propeller to rotate with the propeller and to be displaced along a longitudinal axis with adjustment of a blade angle. An engagement member is configured to engage the feedback ring and to be displaced along a longitudinal direction substantially parallel to the longitudinal axis with displacement of the feedback ring. A sensor comprises a first member coupled to the engine and a second member coupled to the engagement member. The second member is moveable relative to the first member along the longitudinal direction as the engagement member is displaced. The sensor generates a signal indicative of a longitudinal position of the second member relative to the first member. A controller determines an axial position of the feedback ring from the sensor signal.

18 Claims, 7 Drawing Sheets

(56) References Cited

U.S. PATENT DOCUMENTS

| | | | |
|---|---|---|---|
| 8,961,140 B2 | 2/2015 | Badre-Alam et al. | |
| 9,086,076 B2 * | 7/2015 | McCallum | F04D 29/362 |
| 9,423,233 B2 * | 8/2016 | Holt | B64C 11/306 |
| 9,586,673 B2 | 3/2017 | Firanski et al. | |
| 9,821,901 B2 * | 11/2017 | Duke | G01P 3/488 |
| 9,988,937 B2 * | 6/2018 | Curlier | F01D 25/18 |
| 10,435,140 B2 * | 10/2019 | Marone | G01D 5/247 |
| 10,486,827 B2 * | 11/2019 | Yakobov | B64D 45/0005 |
| 2008/0074104 A1 * | 3/2008 | Sauer | G01D 5/145 |
| | | | 324/207.22 |
| 2012/0263593 A1 * | 10/2012 | McCallum | F04D 29/362 |
| | | | 416/147 |
| 2013/0094966 A1 * | 4/2013 | Holt | F04D 29/323 |
| | | | 416/147 |
| 2015/0252690 A1 * | 9/2015 | Curlier | F01D 25/18 |
| | | | 60/39.08 |
| 2018/0050789 A1 * | 2/2018 | Marone | B64C 11/301 |
| 2018/0050816 A1 * | 2/2018 | Yakobov | B64D 45/0005 |
| 2019/0048798 A1 * | 2/2019 | Slawinska | B64D 15/04 |
| 2019/0136867 A1 * | 5/2019 | Albrecht | F15B 20/004 |
| 2020/0017195 A1 * | 1/2020 | Marone | B64C 11/301 |
| 2020/0017234 A1 * | 1/2020 | Marone | B64D 45/02 |

FOREIGN PATENT DOCUMENTS

| | | | | |
|---|---|---|---|---|
| GB | 2465575 A | * | 5/2010 | G01D 5/2457 |
| WO | 2012/004091 | | 1/2012 | |

* cited by examiner

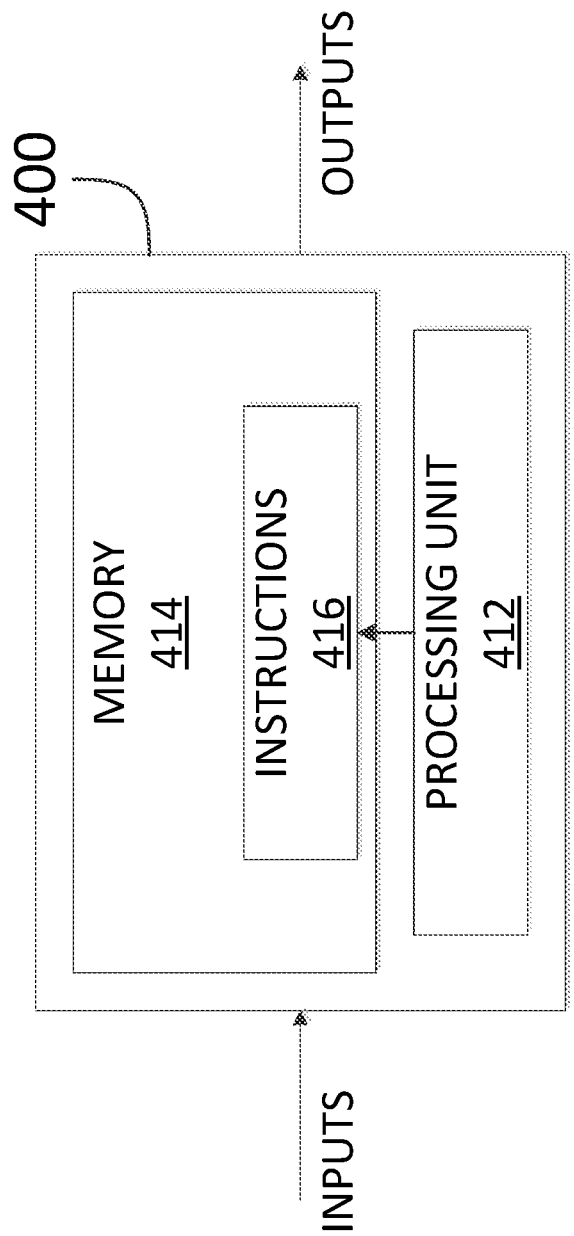

SYSTEM AND METHOD FOR PROPELLER FEEDBACK RING POSITION DETECTION

TECHNICAL FIELD

The application relates generally to propeller feedback systems for aircraft engines and, more particularly, to systems and methods for detecting feedback ring position.

BACKGROUND

Some aircraft engines have propellers with variable pitch, referred to as propeller blade (or beta) angle. In such engines, accurate control of the beta angle is important for proper engine operation. For example, control of the beta angle may allow the blade angle to be controlled according to the desired engine power set-point. Accurate measure of the blade angle also ensures that the propeller is not inadvertently commanded to transition into low or reverse beta angles, which would cause a potentially serious failure condition for the aircraft.

Various methods may be used to measure the blade angle. One such method involves the use of a feedback ring mounted for rotation with the propeller and moveable axially with adjustment of the blade angle. In particular, the blade angle may be obtained from a measurement of the axial displacement of the feedback ring. Existing means of measuring this displacement however have drawbacks, which include their vulnerability to magnetic noise.

There is thus a need for systems and methods for determining a position of a feedback ring of a propeller.

SUMMARY

In accordance with an aspect, a feedback ring position detection system for a propeller of an aircraft engine is provided. The propeller is rotatable about a longitudinal axis and has an adjustable blade angle. The system comprises a feedback ring coupled to the propeller to rotate with the propeller and to be displaced along the longitudinal axis with adjustment of the blade angle; an engagement member configured to engage the feedback ring and to be displaced along a longitudinal direction substantially parallel to the longitudinal axis with displacement of the feedback ring; a sensor comprising a first member coupled to the aircraft engine and a second member coupled to the engagement member, the first member stationary and the second member moveable relative to the first member along the longitudinal direction as the engagement member is displaced, the sensor configured to generate a sensor signal indicative of a longitudinal position of the second member relative to the first member; and a controller configured to receive the sensor signal and to determine an axial position of the feedback ring along the longitudinal axis based on the longitudinal position of the second member relative to the first member.

In accordance with an aspect, an aircraft engine is provided. The aircraft engine comprises a propeller rotatable about a longitudinal axis and having blades with an adjustable blade angle; a feedback ring coupled to the propeller to rotate with the propeller and to be displaced along the longitudinal axis with adjustment of the blade angle; an engagement member configured to engage the feedback ring and to be displaced along a longitudinal direction substantially parallel to the longitudinal axis with displacement of the feedback ring; a sensor comprising a first member coupled to the aircraft engine and a second member coupled to the engagement member, the first member stationary and the second member moveable relative to the first member along the longitudinal direction as the engagement member is displaced, the sensor configured to generate a sensor signal indicative of a longitudinal position of the second member relative to the first member; and a controller configured to receive the sensor signal and to determine an axial position of the feedback ring along the longitudinal axis based on the longitudinal position of the second member relative to the first member.

In accordance with an aspect, a method for determining an axial position of a feedback ring of a propeller of an aircraft engine. The propeller is rotatable about a longitudinal axis and has an adjustable blade angle. The method comprises displacing a moveable sensor member relative to a stationary sensor member, the stationary sensor member coupled to the aircraft engine and the moveable sensor member displaceable relative to the stationary sensor member along a longitudinal direction substantially parallel to the longitudinal axis as the feedback ring is displaced along the longitudinal axis; receiving a sensor signal indicative of a longitudinal position of the moveable sensor member relative to the stationary sensor member; and determining the axial position of the feedback ring along the longitudinal axis based on the longitudinal position of the moveable sensor member relative to the stationary sensor member as obtained from the sensor signal.

BRIEF DESCRIPTION OF DRAWINGS

Reference is now made to the accompanying figures in which:

FIG. 6 is a block diagram of an example computing system for implementing the method of FIG. 5 in accordance with an embodiment.

DETAILED DESCRIPTION

Figure 1:
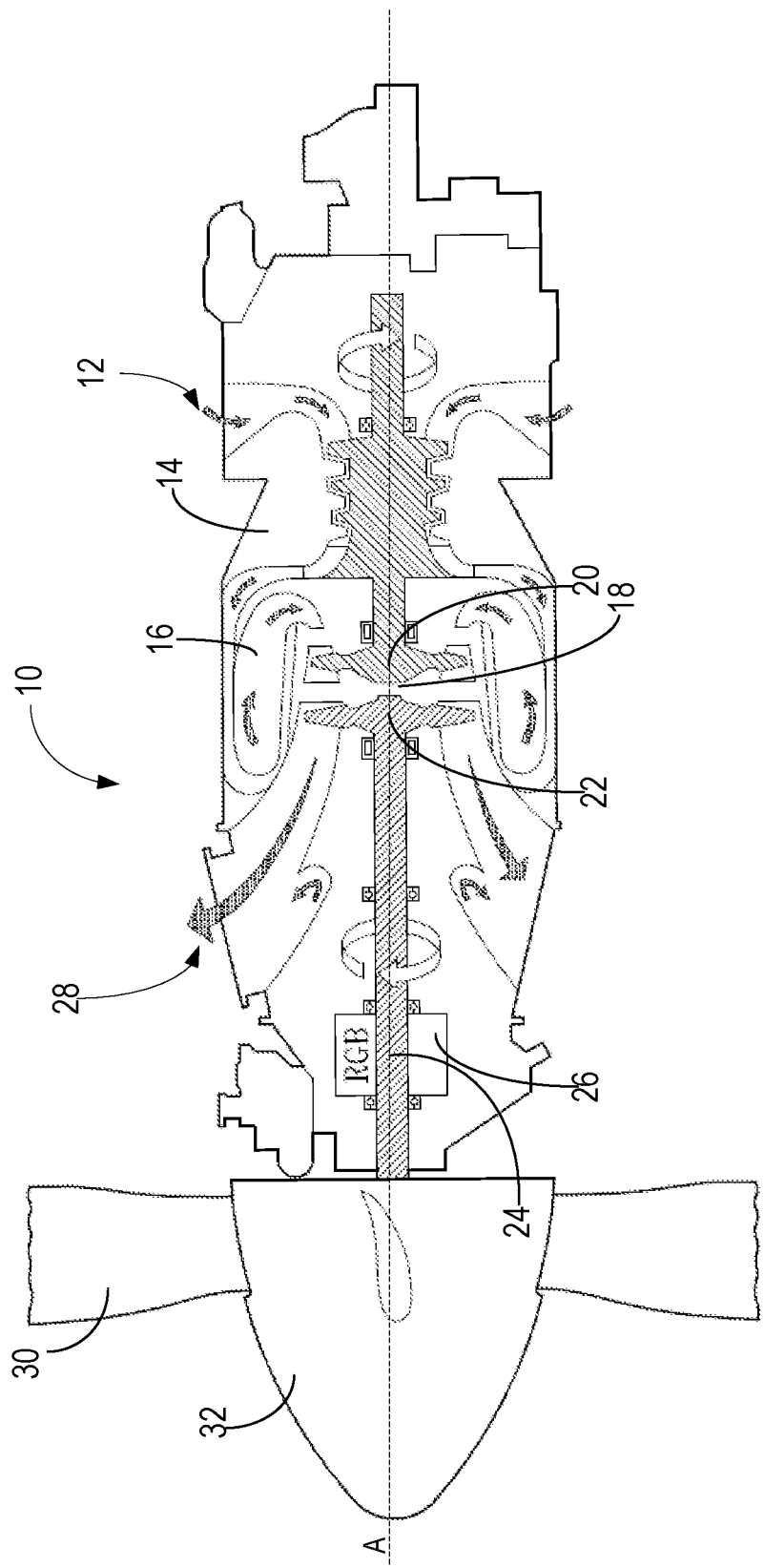
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a longitudinal propeller shaft axis A through a reduction gear box 26. Hot gases may then be evacuated through exhaust stubs 28. The gas generator of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades connected to a hub any suitable means and extending radially therefrom. The blades are also each rotatable about their own radial axes through a plurality of blade angles, which can be changed to achieve modes of operation, such as feather, full reverse, and forward thrust.

Figure 2:
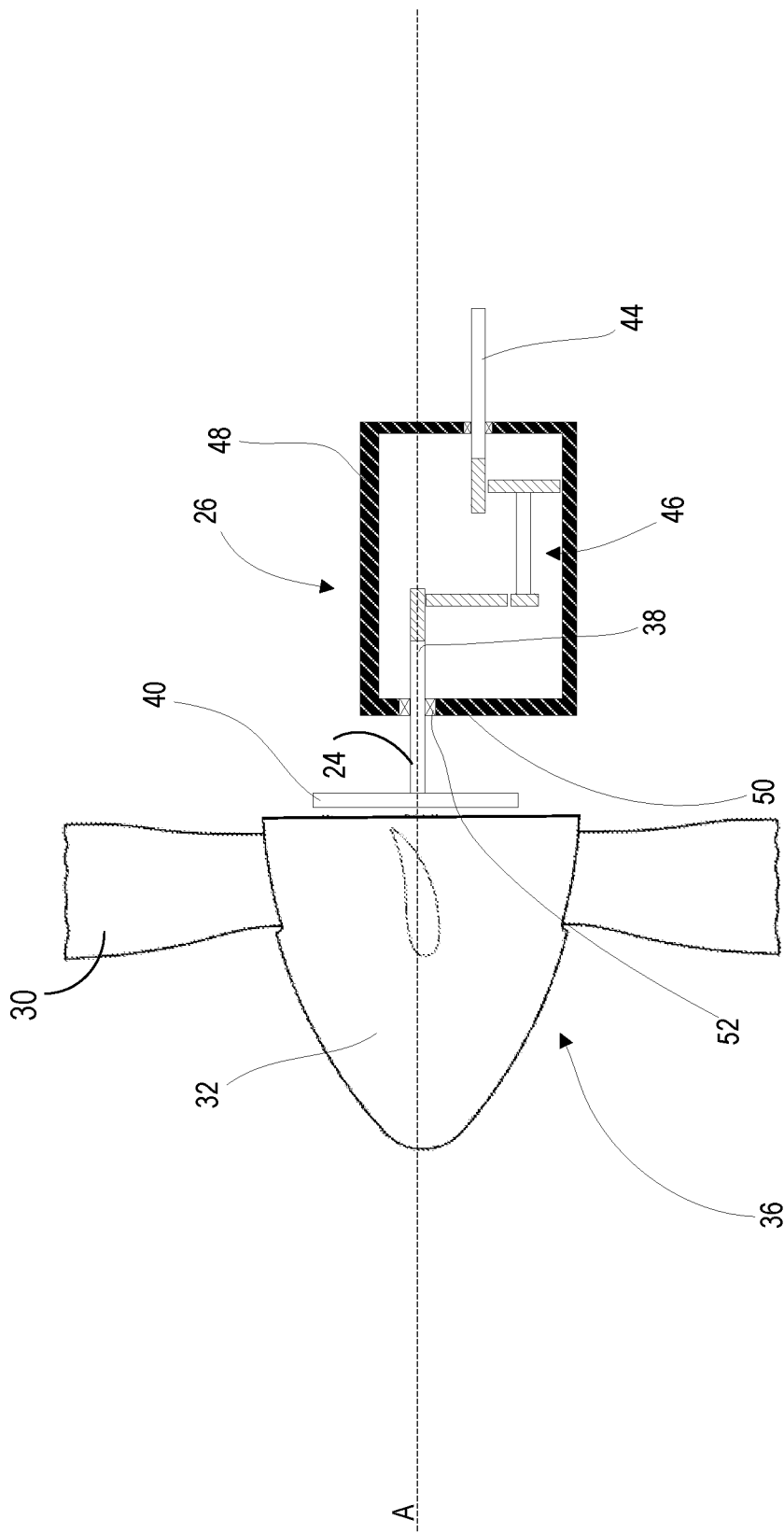
FIG. 2 is a schematic cross-sectional diagram of a propeller assembly comprising a reduction gear box, in accordance with an illustrative embodiment.

As depicted in FIG. 2, the rotor 30 is part of a propeller assembly 36. Rotor 30 is mounted to a propeller shaft 38 with a mounting flange 40. The propeller shaft 38 is received in reduction gear box 26. Reduction gear box 26 receives power from an input shaft 44 which rotates and drives propeller shaft 38 by way of a gear train 46. Propeller shaft 38 and rotor 30 rotate around a longitudinal propeller axis A. As used herein, references to the longitudinal direction refer to a direction substantially parallel to longitudinal propeller axis A. Gear train 46 may reduce angular velocity such that rotor 30 turns at a lower speed than input shaft 44. As depicted, gear train 46 includes two sets of reduction gears. However, gear train 46 could have any number of reduction gears. Alternatively or additionally, gear train 46 may include one or more planetary gear sets. Reduction gear box 26 has a housing 48 with a front wall 50. Propeller shaft 38 is received through an opening in front wall 50 and carried by a bearing 52 which fixes the longitudinal position of propeller shaft 38 relative to housing 48. The reduction gear box 26 may vary depending on practical implementations.

Figure 3:
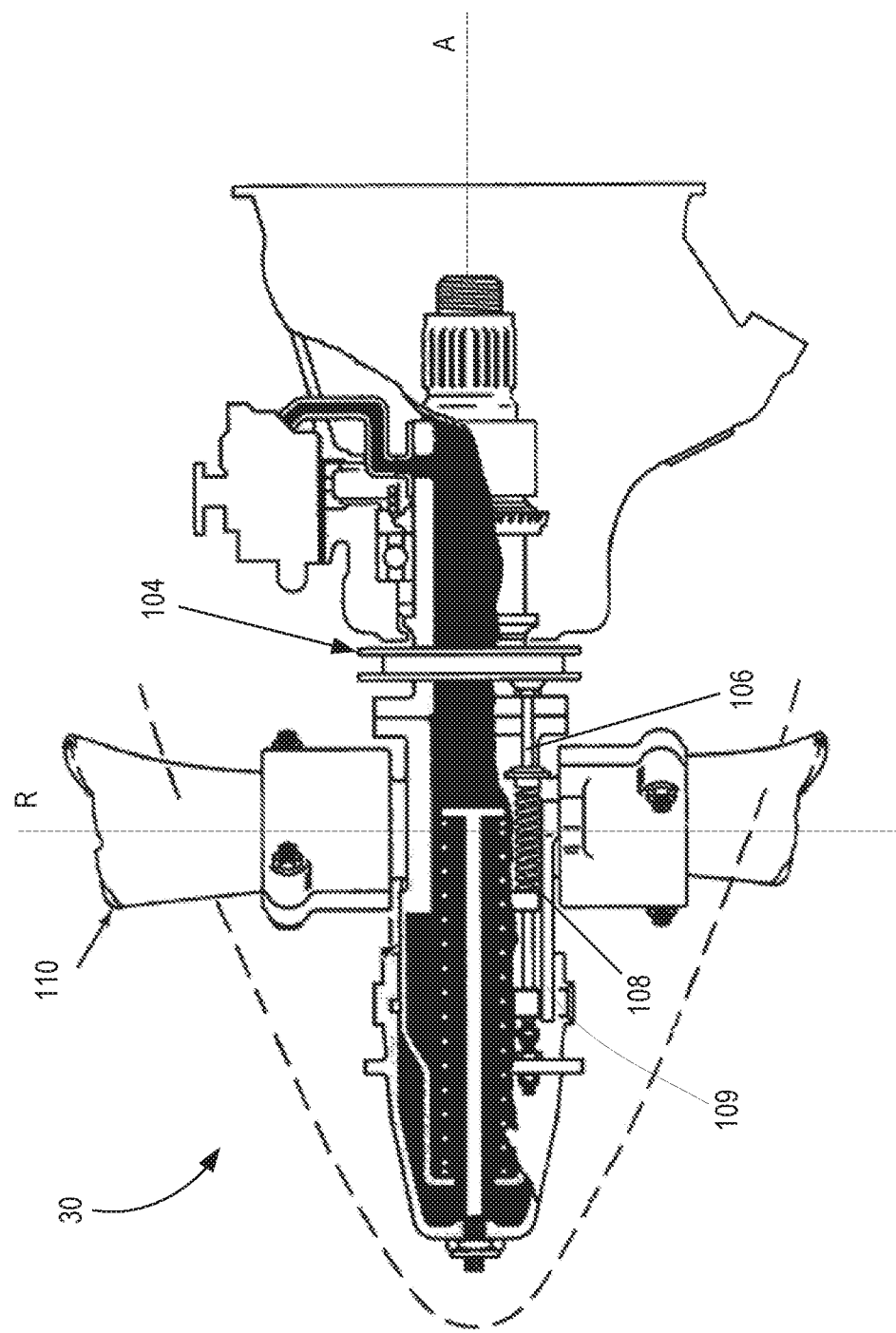
FIG. 3 is a schematic diagram of a propeller assembly comprising a feedback ring, in accordance with an illustrative embodiment.

As depicted in FIG. 3, the propeller 30 comprises a plurality of angularly arranged blades 110 each of which is rotatable about a radially-extending axis R through a plurality of adjustable blade angles, the blade angle being the angle between the chord line (i.e. a line drawn between the leading and trailing edges of the blade) of the propeller blade section and a plane perpendicular to the axis of propeller rotation. The propeller 30 may be a reversing propeller 30 having a plurality of modes of operation, such as feather, full reverse, and forward thrust. In some modes of operations, such as feather, the blade angle is positive. The propeller 30 may be operated in a reverse mode where the blade angle is negative.

A feedback ring 104 is supported for rotation with the propeller 30, which rotates about the longitudinal axis A. The feedback ring 104 is annular and may be referred to as a beta ring or a beta feedback ring. The feedback ring 104 is also supported for longitudinal sliding movement along the longitudinal axis A, e.g. by support members, such as a series of circumferentially spaced beta feedback rods 106 that extend along the longitudinal axis A. A compression spring 108 surrounds an end portion of each rod 106. Feedback ring 104 is mounted to be displaced along the longitudinal direction as the beta angle of the propeller blades is adjusted. Specifically, adjustment of the beta angle causes a corresponding axial movement of the rods 106, and accordingly of the feedback ring 104, substantially parallel to axis A. Conversely, adjustment of the beta angle in a first direction causes feedback ring 104 to move forwardly (e.g. towards the propeller 30), and adjustment of the beta angle in the opposite direction causes feedback ring 104 to move rearwardly (e.g. away from the propeller 30). In an example, rods 106 and feedback ring 104 are moved to a maximally-forward position when blades 110 are at their smallest (or most negative) beta angle, and are moved to a maximally-rearward position when blades 110 are at their largest (or most positive) beta angle. As will be apparent, in other embodiments, this orientation may be reversed. The feedback ring 104 may be used to provide blade (or beta) angle position feedback from an axial position of the feedback ring 104 along the axis A.

Figure 4A:
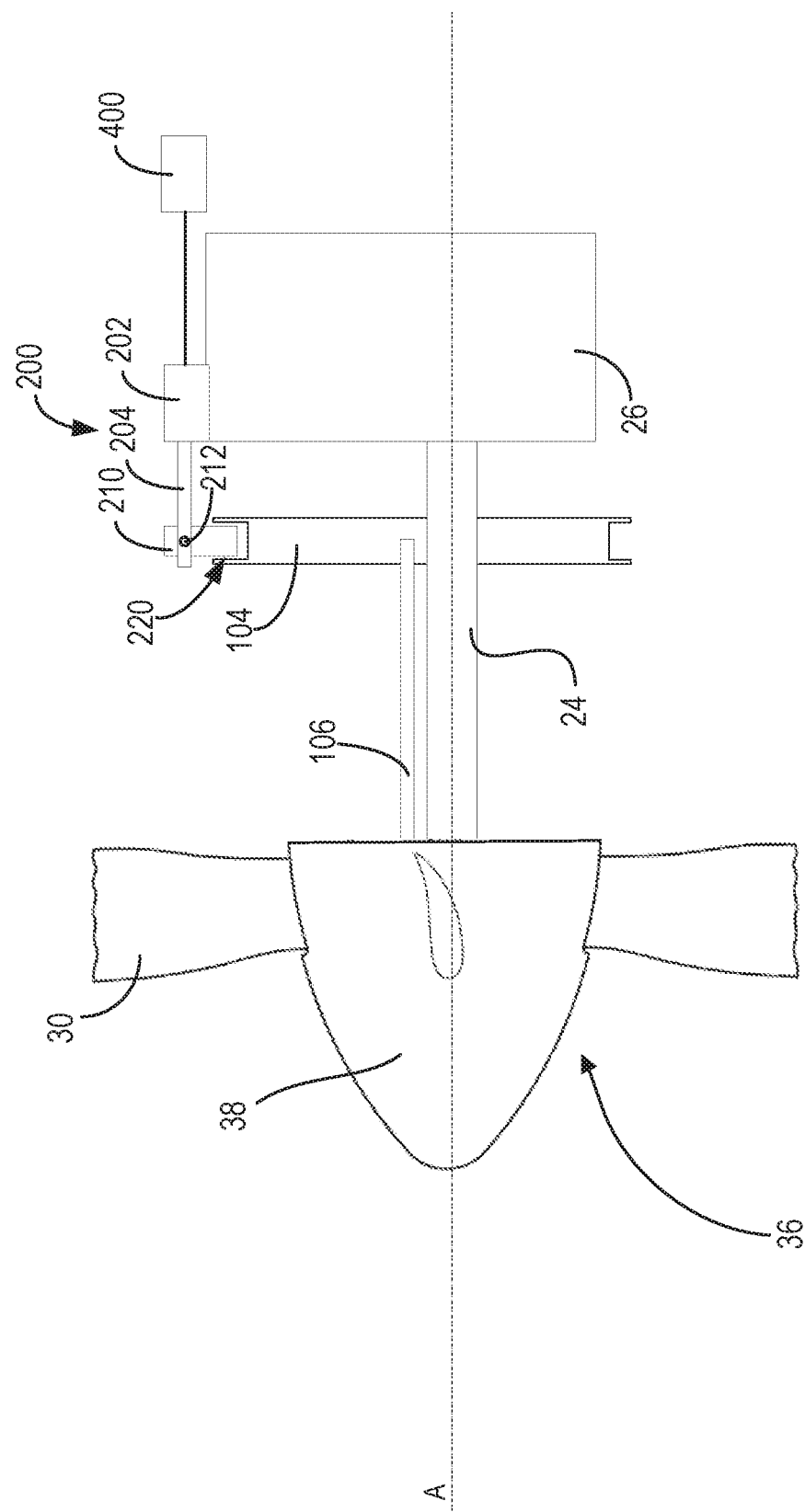
FIG. 4A is a schematic diagram of a propeller assembly comprising the reduction gear box of FIG. 2, the feedback ring of FIG. 3 and a sensor for measuring the position of the feedback ring, in accordance with an illustrative embodiment.

With additional reference to FIG. 4A, a sensor 200 is used for determining the axial position of the feedback ring 104. The sensor 200 comprises a first member 202 and a second member 204 both extending along the longitudinal direction. The first member 202 is illustratively stationary and the second member 204 is displaceable along the longitudinal direction and moveable relative to the first member 202. The first member 202 is coupled to the engine 10 in any suitable manner. In the illustrated embodiment, the first member 202 is secured to the gear box 26. The sensor 200 is configured such that the second member 204 is movable relative to the first member 202 in the longitudinal direction as the feedback ring 104 moves along the longitudinal axis A. For example, the first member 202 may comprise a tube and the second member 204 may comprise an arm (e.g., a rod, shaft, bar or like). The arm may be configured to be received in the tube and to be displaceable along the longitudinal direction, into and out of the tube, as the feedback ring 104 is displaced along the axis A.

The sensor 200 generates a signal that is indicative of a longitudinal position of the second member 204 relative to the first member 202. Accordingly, the signal may be indicative of a longitudinal displacement of the second member 204 relative to a reference position of the first member 202. The reference position may be an arbitrary reference position. When a position of the second member 204 is aligned with the arbitrary reference position of the first member 202, the signal generated by the sensor 200 indicates no displacement. When the second member 204 is moved from the first position to a second position, in response to displacement of the feedback ring 104 along the longitudinal axis A, the sensor 200 generates a signal that is indicative of this second position and accordingly indicative of the displacement of the second member 204 relative to the reference position of the first member 202. It should be understood that the second member 204 may be axially displaced along the longitudinal direction so as to be positioned in a plurality of positions other than the first and second position.

The second member 204 is coupled to an engagement member 210, which is configured to engage the feedback ring 104. The second member 204 may be coupled to the engagement member 210 by any suitable mechanism. For example, in the illustrated embodiment, a fastener 212 is used to couple the second member 204 to the engagement member 210. The fastener 212 may be a pin, screw, bolt, or the like.

In accordance with an embodiment, the feedback ring 104 has formed around a circumference thereof a channel 220 configured to retain the engagement member 210. In the illustrated embodiment, the channel 220 is u-shaped. However, the configuration of the channel 220 may vary depending on practical implementations. The engagement member 210 is a ring engagement member that is configured to move with the feedback ring 104 along the longitudinal axis A and when the feedback ring 104 rotates, the engagement member 210 remains retained in the channel 220. The engagement member 210 may be made of any suitable material(s). In some embodiments, the engagement member 210 is a block. In accordance with a specific and non-limiting example of implementation, the block is made of carbon.

A computing device 400 is connected to the sensor 200 for receiving the signal generated by the sensor 200. The computing device 400 may be referred to as a controller. The computing device 400 is configured to determine the axial position of the feedback ring from the signal generated by the sensor 200. As described elsewhere in this document, the sensor signal is indicative of the position of the second member 204 relative to the first member 202. Accordingly, the axial position of the feedback ring 104 along the longitudinal axis A can be determined from the sensor signal. For example, when the second member 204 is at the first position and aligned with the reference position of the first member 202 (i.e., no displacement of the second member 204 relative to the reference position of the first member 202), this corresponds to a first axial position of the feedback ring 104. When the second member 204 is at the second position, corresponding to a given displacement of the second member 204 relative to the reference position of the first member 202, this corresponds to a second axial position of the feedback ring. Accordingly, a relationship between a displacement of the second member 204 relative to the reference position of the first member 202 may be used to determine the axial position of the feedback ring. For example, a look-up table, a formula or an equation or the like may be used to determine the axial position of the feedback ring from the displacement of the second member 204 relative to the reference position of the first member 202.

The position of the feedback ring 104 may be determined based on known geometries of the engine and/or the various components described herein. For example, a position of the sensor 200 relative to a propeller face datum position (e.g., a position defined by axis R in FIG. 3) may be used to provide a constant value (e.g., a distance between the propeller face datum position and the sensor 200). The measured displacement of the second member 204 relative to the reference position of the first member 202 may be added to the constant value to determine the position of the feedback ring 104. In some embodiments, when there is a repeatable starting position of the feedback ring 104, relative movement may be used to determine the position of the feedback ring 104. A given axial position of the feedback ring corresponds to a given blade angle and the blade angle may therefore be determined from the axial position of the feedback ring 104 by the computing device 400. The configuration of the computing device 400 is described in further detail elsewhere in this document.

In some embodiments, the sensor 200 is a linear variable differential transformer (LVDT). The first member 202 may comprise three solenoidal coils and the second member 204 may comprise a cylindrical ferromagnetic core. The three solenoidal coils may be placed around a tube. The core may be attached to an arm (e.g., a rod, shaft, bar or like) and the arm may be coupled to the engagement member 210. The three solenoidal coils comprise a center coil that is a primary coil, and two outer coils that are top and bottom secondary coils. The core is configured to slide along the axis A and may be configured to move in and out of the tube that the three solenoidal coils are wrapped around. An alternating current drives the primary coil and causes a voltage to be induced in each secondary coil proportional to a length of the core linking to the secondary coils. As the core moves, the primary coil's linkage to the two secondary coils changes and causes an induced voltage to change. In this embodiment, the signal generated by the sensor 200 is an output voltage that is a difference between a top secondary voltage and a bottom secondary voltage. The output voltage varies depending on the position of the second member 204 relative to the first member 202. For example, the value of the output voltage may change linearly with an amount of change of the axial displacement of the second member 204 relative to the reference position of the first member 202. Accordingly, a given value of the output voltage may correspond to a given axial position of the feedback ring 104.

Figure 4B:
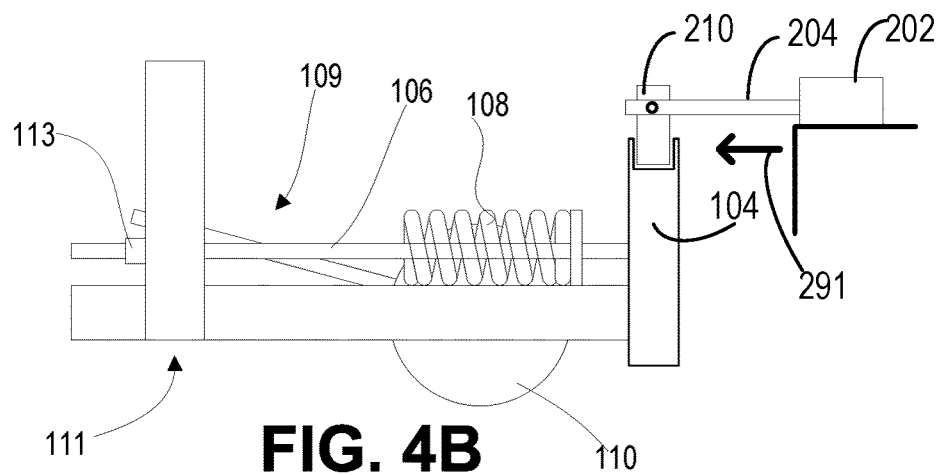
FIGS. 4B, 4C and 4D are schematic diagrams showing longitudinal movement of the feedback ring and of the sensor of FIG. 4A.
Figure 4C:
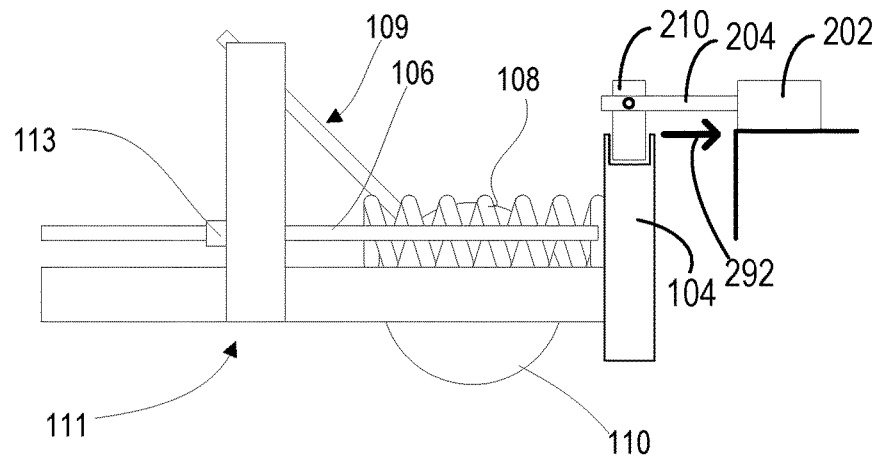
Figure 4D:
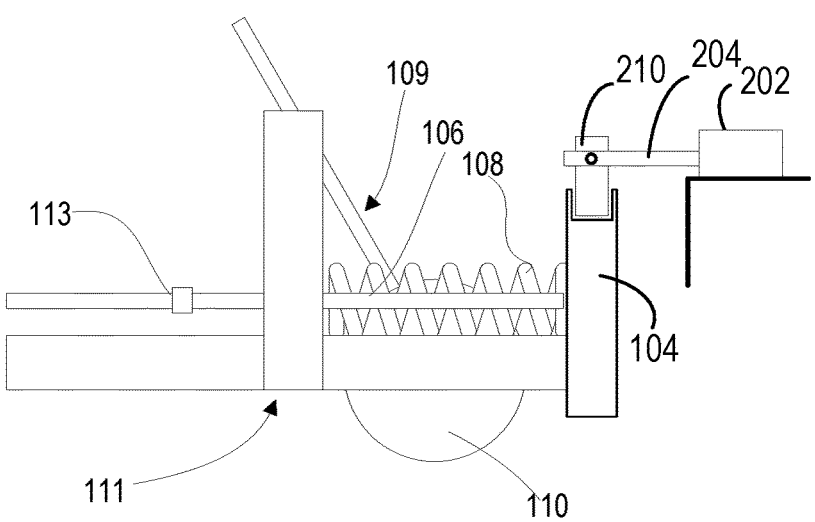

With reference to FIGS. 4B, 40 and 4D, an example illustrates longitudinal movement of the feedback ring 104 and of the second member 204 of the sensor 200. In this example, actuators 109 engage with a piston assembly 111 for adjusting the beta angle of the blades. Specifically, the piston assembly 111 moves back and forth along the longitudinal direction and cause rotation of blades 110 by sliding engagement with the actuators 109. In the depicted embodiment, forward motion of the piston assembly 111 reduces the beta angle of the blades 110 and rearward motion increases the beta angle. However, in other embodiments, this may be reversed. Piston assembly 111 also engages the rod 106 as the piston assembly 111 adjusts the beta angle. As shown in FIG. 4B, during a portion of the forward motion of piston assembly 111, the piston assembly 111 bears against a stop 113 mounted to the rod 106, pulling rod 106 and feedback ring 104 in a forward direction (illustrated by arrow 291) and compressing spring 108. The second member 204 also moves forward with the forward movement of the feedback ring 104. As shown in FIG. 4C, as piston assembly 111 moves in a rearward direction (illustrated by arrow 292), spring 108 urges rod 106 and feedback wheel 104 rearwardly. The second member 204 also moves rearwardly with the rearward movement of the feedback ring 104. In the depicted embodiment, feedback wheel 104 reaches a maximally-rearward position (the position shown in FIG. 4C) before piston assembly 111 reaches its maximally-rearward position. After feedback ring 104 reaches the maximally-rearward position, piston assembly 111 moves out of contact with stop 113 as shown in FIG. 4D, after which further rearward movement of piston assembly 111 does not cause movement of feedback ring 104. Other suitable configurations for adjusting the beta angle and causing a corresponding longitudinal movement of the feedback wheel 104 will be apparent to skilled persons.

Figure 5:
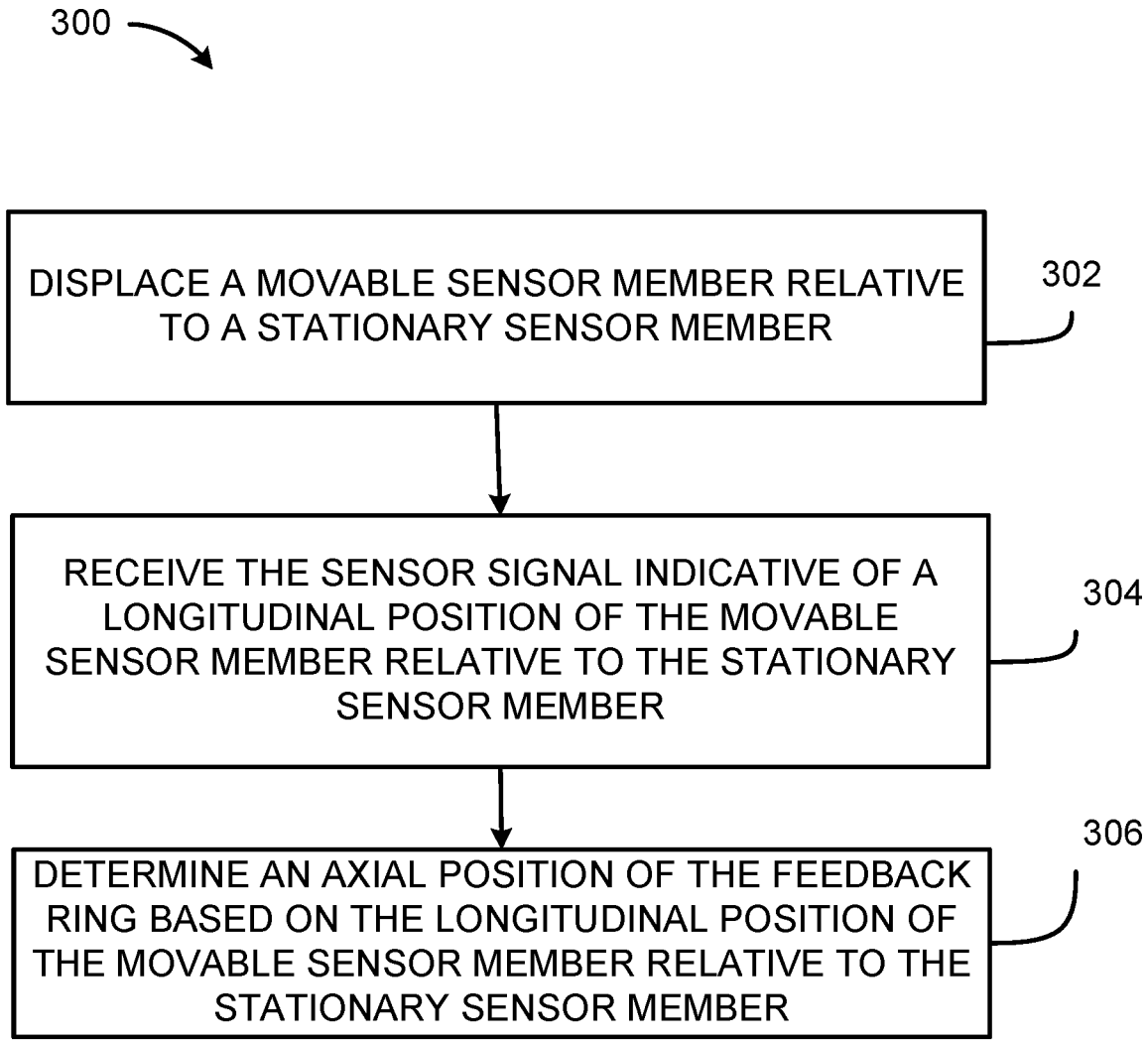
FIG. 5 is a flowchart of a method for determining an axial position of the feedback ring, in accordance with an illustrative embodiment.

With reference to FIG. 5, there is shown a flowchart illustrating an example method 300 for determining the axial position of the feedback ring 104. While method 300 is described herein with reference to engine 10, this is for example purposes. The method 300 may be applied to any suitable engine. At step 302, a moveable sensor member (also referred to herein as the second member 204) is displaced relative to a stationary sensor member (also referred to herein as the first member 202). The stationary sensor member 202 is coupled to the aircraft engine 10 and the movable sensor member 204 is displaceable relative to the stationary sensor member 204 along the longitudinal direction substantially parallel to the longitudinal axis A as the feedback ring 104 is displaced along the longitudinal axis A. A sensor signal indicative of the longitudinal position of the movable sensor member relative to the stationary sensor member is generated at the sensor 200. At step 304, the sensor signal indicative of the position of the movable sensor member 204 relative to the stationary sensor member 202 is received. The sensor signal may be as described elsewhere in this document. At step 306, the axial position of the feedback ring 104 is determined based on the longitudinal position of the movable sensor member 204 relative to the stationary sensor member 202. The determination of the axial position of the feedback ring 104 may be determined as described elsewhere in this document. The axial position of the feedback ring 104 may also be referred to as a longitudinal position of the feedback ring 104. The propeller blade angle may then be determined as a function of the axial position of the feedback ring 104. The determined propeller blade angle may be outputted to an aircraft computer, for example, to display the propeller blade angle on an aircraft or cockpit display. The determined propeller blade angle may be used by the controller 400 (or another engine controller and/or aircraft computer) for various engine and/or aircraft control. For example, the determined propeller blade angle may be used for synchrophasing to adjust the blade angle of each propeller of a plurality of engines of a multi-engine propeller driven aircraft. For instance, engine controller(s) and/or aircraft computer(s) may adjust the propeller blade angle of each engine based on the determined propeller blade angles of the plurality of engines.

In some embodiments, the sensor signal is indicative of a longitudinal displacement of the moveable sensor member 204 relative to a reference position of the stationary sensor member 202. In some embodiments, the axial position of the feedback ring 104 is determined based on the longitudinal displacement of the moveable sensor member 204 relative to the reference position of the stationary sensor member 202. In some embodiments, displacing the moveable sensor member 204 relative to the stationary sensor 202 member comprises displacing the moveable sensor member 204, comprising a ferromagnetic core of a linear variable differential transformer, relative to a reference position of the stationary sensor member 202, comprising a plurality of solenoidal coils of the linear variable differential transformer.

With reference to FIG. 6, the method 300 may be implemented at least in part by using the computing device 400 comprising a processing unit 412 and a memory 414 which has stored therein computer-executable instructions 416. The processing unit 412 may comprise any suitable devices configured to implement the system such that instructions 416, when executed by the computing device 400 or other programmable apparatus, may cause the functions/acts/steps of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including electronic engine control (EEC), engine control unit (ECU), and the like.

The methods and systems for determining the axial position of a feedback ring described herein may be implemented in a high level procedural or object oriented programming or scripting language, or a combination thereof, to communicate with or assist in the operation of a computer system, for example the computing device 400. Alternatively, the methods and systems for determining the axial position of a feedback ring may be implemented in assembly or machine language. The language may be a compiled or interpreted language. Program code for implementing the methods and systems for determining the axial position of a feedback ring may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for determining the axial position of a feedback ring may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for determining the axial position of a feedback ring may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A feedback ring position detection system for a propeller of an aircraft engine, the propeller rotatable about a longitudinal axis and having an adjustable blade angle, the system comprising:
  a feedback ring coupled to the propeller to rotate with the propeller and to be displaced along the longitudinal axis with adjustment of the blade angle;
  an engagement member configured to moveably engage the feedback ring and to be displaced along a longitudinal direction substantially parallel to the longitudinal axis with displacement of the feedback ring;
  a sensor comprising a first member coupled to the aircraft engine and a second member coupled to the engagement member, the first member stationary and the second member moveable relative to the first member along the longitudinal direction as the engagement member is displaced, the sensor configured to generate a sensor signal indicative of a longitudinal position of the second member relative to the first member; and
  a controller configured to receive the sensor signal and to determine an axial position of the feedback ring along the longitudinal axis based on the longitudinal position of the second member relative to the first member.

2. The system of claim 1, wherein the feedback ring has a channel formed around a circumference thereof.

3. The system of claim 2, wherein the engagement member is configured to be retained in the channel.

4. The system of claim 3, wherein the channel is u-shaped and the engagement member is a block.

5. The system of claim 1, wherein the sensor is a linear variable differential transformer, the first member comprising a plurality of solenoidal coils and the second member comprising a ferromagnetic core.

6. The system of claim 1, wherein the first member is secured to a gear box of the aircraft engine.

7. The system of claim 1, wherein the sensor is configured to generate the sensor signal indicative of a longitudinal displacement of the second member relative to a reference position of the first member.

8. An aircraft engine comprising:
  a propeller rotatable about a longitudinal axis and having blades with an adjustable blade angle;
  a feedback ring coupled to the propeller to rotate with the propeller and to be displaced along the longitudinal axis with adjustment of the blade angle;
  an engagement member configured to moveably engage the feedback ring and to be displaced along a longitudinal direction substantially parallel to the longitudinal axis with displacement of the feedback ring;
  a sensor comprising a first member coupled to the aircraft engine and a second member coupled to the engagement member, the first member stationary and the second member moveable relative to the first member along the longitudinal direction as the engagement member is displaced, the sensor configured to generate a sensor signal indicative of a longitudinal position of the second member relative to the first member; and
  a controller configured to receive the sensor signal and to determine an axial position of the feedback ring along the longitudinal axis based on the longitudinal position of the second member relative to the first member.

9. The engine of claim 8, wherein the feedback ring has a channel formed around a circumference thereof.

10. The engine of claim 9, wherein the engagement member is configured to be retained in the channel.

11. The engine of claim 10, wherein the channel is u-shaped and the engagement member is a block.

12. The engine of claim 8, wherein the sensor is a linear variable differential transformer, the first member comprising a plurality of solenoidal coils and the second member comprising a ferromagnetic core.

13. The engine of claim 8, wherein the first member is secured to a gear box of the aircraft engine.

14. The engine of claim 9, wherein the sensor is configured to generate the sensor signal indicative of a longitudinal displacement of the second member relative to a reference position of the first member.

15. A method for determining an axial position of a feedback ring of a propeller of an aircraft engine, the propeller rotatable about a longitudinal axis and having an adjustable blade angle and the feedback ring rotatable with the propeller, the method comprising:
  displacing a moveable sensor member relative to a stationary sensor member, the stationary sensor member coupled to the aircraft engine and the moveable sensor member displaceable relative to the stationary sensor member along a longitudinal direction substantially parallel to the longitudinal axis as the feedback ring is displaced along the longitudinal axis;
  receiving a sensor signal indicative of a longitudinal position of the moveable sensor member relative to the stationary sensor member; and
  determining the axial position of the feedback ring along the longitudinal axis based on the longitudinal position of the moveable sensor member relative to the stationary sensor member as obtained from the sensor signal.

16. The method of claim 15, wherein the sensor signal is indicative of a longitudinal displacement of the moveable sensor member relative to a reference position of the stationary sensor member.

17. The method of claim 16, wherein the axial position of the feedback ring is determined based on the longitudinal displacement of the moveable sensor member relative to the reference position of the stationary sensor member.

18. The method of claim 15, wherein the moveable sensor member comprises a ferromagnetic core of a linear variable differential transformer, and the stationary sensor member comprises a plurality of solenoidal coils of the linear variable differential transformer.

* * * * *